United States Patent
Karger

(10) Patent No.: US 11,754,249 B2
(45) Date of Patent: Sep. 12, 2023

(54) LIGHTING DEVICE AND METHOD FOR JOINING A LIGHTING DEVICE

(71) Applicant: HELLA GmbH & Co. KGaA, Lippstadt (DE)

(72) Inventor: Odo Karger, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/957,914

(22) Filed: Sep. 30, 2022

(65) Prior Publication Data

US 2023/0021808 A1  Jan. 26, 2023

Related U.S. Application Data

(63) Continuation of application No. PCT/EP2021/057057, filed on Mar. 19, 2021.

(30) Foreign Application Priority Data

Apr. 3, 2020  (DE) .................... 10 2020 109 359.4

(51) Int. Cl.
| | |
|---|---|
| F21S 41/29 | (2018.01) |
| F21S 41/20 | (2018.01) |
| F21S 43/27 | (2018.01) |
| F21S 43/20 | (2018.01) |

(52) U.S. Cl.
CPC .............. *F21S 41/29* (2018.01); *F21S 41/28* (2018.01); *F21S 43/26* (2018.01); *F21S 43/27* (2018.01)

(58) Field of Classification Search
CPC .. F21S 41/28; F21S 41/29; F21S 43/26; F21S 43/27
See application file for complete search history.

(56) References Cited

U.S. PATENT DOCUMENTS

| | | | |
|---|---|---|---|
| 11,104,083 B2 | 8/2021 | Schuette | |
| 2005/0117362 A1 | 6/2005 | Yamada et al. | |
| 2009/0231872 A1 | 9/2009 | Mesko et al. | |
| 2013/0242587 A1 | 9/2013 | Hirabayashi et al. | |
| 2015/0306801 A1* | 10/2015 | Ito | B29C 45/16 |
| | | | 428/137 |

(Continued)

FOREIGN PATENT DOCUMENTS

| | | |
|---|---|---|
| DE | 19728445 C1 | 1/1999 |
| DE | 20203773 U1 | 6/2002 |

(Continued)

OTHER PUBLICATIONS

International Search Report dated May 14, 2021 in corresponding application PCT/EP2021/057057.

*Primary Examiner* — Thomas M Sember
(74) *Attorney, Agent, or Firm* — Muncy, Geissler, Olds & Lowe, P.C.

(57) ABSTRACT

A lighting device for a vehicle, comprising a housing, an illuminant arranged in the housing and comprising a light panel for the passage of light generable by the illuminant, wherein a frame is provided, which is molded onto the light panel at least on the edge side in an at least sectionally circumferential fashion using a plastic injection molding process, and wherein the frame is joined to a connection portion of the housing by means of a plastic welded seam. The invention further relates to a method for producing a lighting device.

7 Claims, 1 Drawing Sheet

(56) References Cited

U.S. PATENT DOCUMENTS

2016/0363284 A1    12/2016  Colombel et al.
2017/0074479 A1*    3/2017  Kohata ................ B29C 66/542

FOREIGN PATENT DOCUMENTS

| DE | 102010024169 A1 | 12/2011 |
| DE | 102016123203 A1 |  6/2018 |
| DE | 202018106141 U1 |  1/2020 |
| EP |       3104066 A1 | 12/2016 |
| KR |    20120029939 A |  3/2012 |
| KR |    20120107719 A | 10/2012 |
| WO |  WO2018041707 A1 |  3/2018 |

* cited by examiner

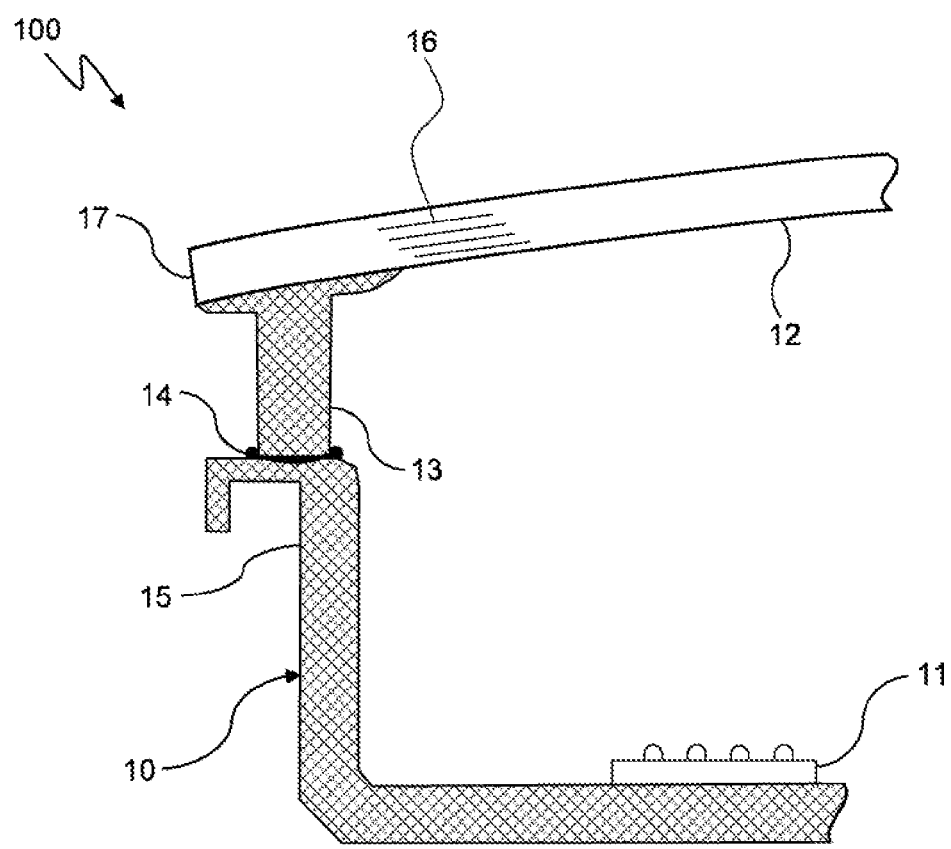

LIGHTING DEVICE AND METHOD FOR JOINING A LIGHTING DEVICE

This nonprovisional application is a continuation of International Application No. PCT/EP2021/057057, which was filed on Mar. 19, 2021, and which claims priority to German Patent Application No. 10 2020 109 359.4, which was filed in Germany on Apr. 3, 2020, and which are both herein incorporated by reference.

BACKGROUND OF THE INVENTION

Field of the Invention

The present invention relates to a lighting device for a vehicle, comprising a housing, an illuminant arranged in the housing and comprising a light panel for the passage of light generable by the illuminant. Further, the invention relates to a method for producing a lighting device by means of a joining method.

Description of the Background Art

Various joining methods and connecting devices are known for producing a motor vehicle headlight. These include bonding, welding, screwing, and locking connections with the respective connecting devices designed for this purpose.

A vehicle headlight having a housing, a reflector, a cover plate, and a frame is known from DE 19728445 C1. The reflector, cover plate, and frame are connected together to form an insert. According to the disclosure, the reflector, cover plate, and frame are glued together, so that an insert is formed which can be handled as a single piece and has to be aligned and inserted only once in its entirety with respect to a housing. Joining by means of a gluing process places high demands on the tolerances of the components to be glued together. In addition, joining by means of the gluing process is costly and time-consuming.

A method for joining a lens to a housing of a lighting device for a motor vehicle is known from WO 2018/041707 A1. According to the disclosure, a lens made of plastic is joined materially to a housing, made of plastic, of a lighting device by means of a welding process. In order to achieve the dimensions, in particular a target height of the finished joined lighting device, a correction value is determined by means of a sensor element and a reference surface, which is used for exact positioning of the lens relative to the housing. An indentation depth, created during the welding process, also known as the welding depth, is taken into account. The welding process, during which the joining partners are exposed to high temperatures at their joining point and wherein nonuniform cooling processes, irregular in terms of location and time, also occur, gives rise to residual stresses or internal stresses which can lead to cracking (stress cracking). In addition to the type and magnitude of the residual stress, stress cracking is also dependent on the materials welded together. Stress cracking is also dependent on external influences acting on the joint as well as on the materials of the joining partners. In particular, chemically or physically active media such as water, ethanol, toluene, and heptane can reduce stress crack resistance and thus promote the formation of stress cracks. The materials polymethyl methacrylate (PMMA) and polycarbonate (PC) in particular are used for the lens of lighting devices. These materials are particularly susceptible to stress cracking.

To reduce residual stress, it is therefore common practice to subject the components, welded together, to a heat treatment in an annealing furnace. However, annealing is time-consuming and costly and adversely affects production flexibility. A further disadvantage of annealing is that relaxation is accompanied by a certain deformation of the component. In a lighting device, this deformation is particularly critical because it can lead to degradation of a light pattern and a beam path through the light panel.

SUMMARY OF THE INVENTION

It is therefore an object of the present invention to provide a lighting device that can be produced inexpensively and flexibly and is dimensionally stable and has a long service life, in particular a high resistance to stress cracking. A further object of the invention is to provide an inexpensive and rapid method for producing an advantageous lighting device.

In an exemplary embodiment, the invention includes the technical teaching that a frame is provided, which is molded onto the light panel at least on the edge side in an at least sectionally circumferential fashion using a plastic injection molding process, and wherein the frame is joined to a connection portion of the housing by means of a plastic welded seam. The invention is based on the idea that by using suitable materials for the housing and for molding the frame onto the light panel after joining the frame to the housing by welding, annealing can be omitted. On the one hand, this shortens the manufacturing time and reduces production costs. Furthermore, it is ensured that the lighting device has a desired shape and that a desired light pattern and beam path are guaranteed.

At least the connection portion of the housing and the frame have a material with which a stress crack resistant plastic welded seam is formed. Stress crack resistance is determined by various influencing factors. In addition to the geometry of the connection portion and the frame, these are also dependent on the type of stress, stress intensity, and stress frequency, as well as the temperature and resistance to physically and chemically active media. Furthermore, the properties of the material as such, for example, the chemical structure and composition, as well as their morphology play a role. The resistance of the material and the plastic welded seam to physically and chemically active media, such as, for example, water, ethanol, toluene, and heptane, has a particularly strong influence on stress crack resistance. During stress cracking, crazes appear first, which then develop into cracks on a component surface. This cracking occurs when a local stress is exceeded.

Stress crack resistance is thus defined by the absence or only slight formation of crazes and cracks in the respective material and the plastic welded seam. Advantageously, the frame and/or the housing, but at least the connection portion of the housing, have a material at least comprising acrylonitrile-styrene-acrylate copolymers (ASA), ASA-HT, PBT+ASA-[GF20], and/or a material containing acrylonitrile-styrene-acrylate copolymers. Particularly advantageously, the housing, but at least the connection portion of the housing, is fabricated from PBT+ASA-[GF20]. Particularly advantageously, the frame is fabricated from acrylonitrile-styrene-acrylate copolymers (ASA), ASA-HT, or from a material containing acrylonitrile-styrene-acrylate copolymers. The light panel is particularly advantageously fabricated from polymethyl methacrylate (PMMA) or polycarbonate (PC). As a result, a lighting device is created that can be fabricated quickly and inexpensively without annealing and can be installed in a vehicle. A material containing acrylonitrile-styrene-acrylate copolymers is, for example, PBT+ASA-[GF20].

The connection portion and the frame are formed from an identical material. This has the advantage that the material properties of the connection portion and the frame, which are joined together, are also identical and thus joining by means of a plastic welded seam is simple and a low residual stress level can be achieved due to the identical melting point and material properties.

The connection portion and the frame can be formed from different materials. This has the advantage that suitable materials can be selected depending on further requirements for the frame and the connection portion. Costs can be saved, for example, as a result.

Advantageously, the material of the frame is opaque. Such a frame, which is black in color, for example, can prevent adjacent lighting chambers from being illuminated. A partitioning of the lighting device and a structural connection are achieved synergistically thereby. For example, the frame can form a boundary between an area for the direction indicator, the brake light, the driving light, as well as the reversing light and a rear fog light of a rear light, which are designed in different colors and thus are to be illuminated only depending on a driving situation and operating situation of the vehicle. The same applies to a front headlight in which an area for a direction indicator, a low beam, and a high beam are separated from one another in an opaque manner.

The plastic welded seam between the housing and the frame is formed continuously as a closed contour. A sealing of the lighting device against external influences is achieved thereby. In particular, the continuous plastic welded seam prevents moisture from penetrating into an interior space in which the illuminant is located. This ensures reliable operation of the lighting device. In an advantageous embodiment of the lighting device, the lighting device is designed as a front headlight and/or as a rear light. This ensures that the front headlight and/or the rear lamp have a desired light pattern and beam path and that optimum illumination of the roadway or signal function is achieved. Furthermore, it is prevented that a distorted light pattern and beam path dazzle oncoming traffic or a light signal is misinterpreted.

To form multiple light chambers, the frame can also be molded onto further sections of the light panel in addition to being arranged by means of molding along an outer edge of the light panel.

The object of the invention is achieved further by means of a method for producing the advantageous lighting device. The method comprises at least the steps: molding the frame onto the light panel using a plastic injection molding process, arranging the frame on a connection portion of the housing, and joining the frame to the connection portion by means of a plastic welding process. The inventive concept also comprises the molding of the light panel onto the frame in a plastic injection molding process. Plastic injection molding processes have the advantage that they are easily controllable and can be carried out quickly, which can save costs in production. Joining the frame to the connection portion by means of a plastic welding process has the advantage that plastic welding processes can be performed quickly and are inexpensive. A further advantage is that the light panel is not adversely affected by the plastic welding process on the frame.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing, which is given by way of illustration only, and thus, is not limitive of the present invention, and wherein the sole FIGURE shows, in a sectional view, a lighting device comprising a light panel, a frame, and a housing guided with the frame by means of a plastic welded seam.

DETAILED DESCRIPTION

The FIGURE shows a sectional view of a lighting device 100 embodied as a rear lamp for a motor vehicle. The lighting device comprises a housing 10 and an illuminant 11 held thereto, comprising a plurality of light emitting diodes (LEDs). Furthermore, lighting device 100 comprises a light panel 12, which is produced by means of a 2-component injection molding process with a frame 13. Light panel 12 is fabricated from a polymethyl methacrylate (PMMA), in particular injection molded in a plastic injection molding process. Frame 13 is formed of the material acrylonitrile-styrene-acrylate copolymer (ASA) and was molded onto light panel 12 in a 2-component injection molding process. Housing 10, having a connection portion 15 for joining with frame 13, is formed of acrylonitrile-styrene-acrylate copolymer (ASA) as a uniform material. Frame 13 and connection portion 15 were joined materially to one another by a plastic welding process with the formation of a plastic welded seam 14. Due to the identical materials of frame 13 to be joined and housing 10, residual stresses arising due to the plastic welding process are relatively low. The acrylonitrile-styrene-acrylate copolymer material further exhibits high stress crack resistance, and plastic welded seam 14 is stress crack resistant as a result. The stress crack resistance is also retained when the welded seam comes into contact with media such as water, ethylene, heptane, or toluene. Thus, it is made possible that lighting device 100 can be installed directly in a motor vehicle without temperature aging in an annealing furnace to reduce residual stresses. Omitting annealing also avoids deformation of lighting device 100 associated with relaxation of plastic welded seam 14 during annealing. Furthermore, it is ensured that a set position and orientation of illuminant 11 relative to light panel 12, scattered light section 16, and further optical elements of the lighting device are maintained. This achieves that a light pattern and desired beam path are guaranteed. Frame 13 is fabricated of a material that is nontransparent to light and has a black color. As a result, leakage of light through the frame into an adjacent area is prevented. Nontransparent frame 13 thus also enables light-tight separation of individual lighting chambers of the lighting device.

Frame 13 is molded along an outer edge 17 of light panel 12 using the 2-component injection molding process. Plastic welded seam 14 between housing 10 and frame 13 runs continuously as a contour parallel to outer edge 17 of light panel 12. Thus, plastic welded seam 14 and the connection between frame 13 and light panel 12, together with light panel 12, frame 13, and housing 10, create a sealed interior of lighting device 100 into which water, particles, or other media cannot penetrate. In particular, this protects an electrical system and illuminant 11 from external influences and ensures reliable operation and a long service life of lighting device 100.

The invention is not limited in its implementation to the preferred exemplary embodiment described above. Rather, a number of variants are conceivable which make use of the shown solution even in the case of fundamentally different embodiments. All features and/or advantages arising from the claims, the description, or the drawings, including structural details, spatial arrangements, and method steps, can be essential to the invention both individually and in a wide variety of combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device for a vehicle, the lighting device comprising:
    a housing;
    an illuminant arranged in the housing;
    a light panel for the passage of light generated by the illuminant; and
    a frame that is molded onto the light panel at least on an edge side of the light panel in an at least sectionally circumferential fashion using a plastic injection molding process, the frame being joined to a connection portion of the housing by a plastic welded seam,
    wherein the frame and at least the connection portion of the housing are formed of a material at least comprising acrylonitrile-styrene-acrylate copolymers (ASA), ASA-HT, PBT+ASA-[GF20], and/or a material containing acrylonitrile-styrene-acrylate copolymers.

2. The lighting device according to claim 1, wherein at least the connection portion of the housing and the frame are formed of a material such that the plastic welded seam is a stress crack resistant plastic welded seam.

3. The lighting device according to claim 1, wherein the connection portion and the frame are formed from an identical material.

4. The lighting device according to claim 1, wherein a material of the frame is opaque.

5. The lighting device according to claim 1, wherein the plastic welded seam between the housing and the frame is formed continuously as a closed contour on the edge side of the light panel.

6. The lighting device according to claim 1, wherein the lighting device is a front headlight and/or a rear light of the vehicle.

7. A method for producing the lighting device according to claim 1, the method comprising:
    molding the frame onto the light panel using the plastic injection molding process;
    arranging the frame on the connection portion of the housing; and
    joining the frame to the connection portion by a plastic welding process.

* * * * *